United States Patent

Yoshida et al.

[11] Patent Number: 5,930,088
[45] Date of Patent: Jul. 27, 1999

[54] OPTICAL DISC HAVING A PROTECTIVE LAYER WHICH IS THICKER AT ITS OUTER PERIPHERY

[75] Inventors: Mikio Yoshida; Masaki Takenouchi, both of Miyagi, Japan

[73] Assignee: Sony Corporation, Tokyo, Japan

[21] Appl. No.: 08/908,739

[22] Filed: Aug. 7, 1997

Related U.S. Application Data

[63] Continuation of application No. 07/994,662, Dec. 22, 1992, abandoned.

[30] Foreign Application Priority Data

Dec. 28, 1991 [JP] Japan ................................. 3-359087
Oct. 30, 1992 [JP] Japan ................................. 4-314331

[51] Int. Cl.⁶ .............................. G11B 5/82; G11B 7/24
[52] U.S. Cl. ............................................. 360/114; 369/286
[58] Field of Search .................................... 360/114, 135; 369/284, 286, 288, 275.1, 275.2, 275.5; 428/694 ML, 694 SC, 694 DE

[56] References Cited

U.S. PATENT DOCUMENTS

| | | | |
|---|---|---|---|
| 4,584,259 | 4/1986 | Mayer et al. | 369/275.5 |
| 4,788,095 | 11/1988 | Machida et al. | 428/694 |
| 4,980,875 | 12/1990 | Ishiwata et al. | 369/275.2 |
| 5,202,863 | 4/1993 | Miyatake et al. | 360/114 |
| 5,210,673 | 5/1993 | Ito et al. | 360/135 |

FOREIGN PATENT DOCUMENTS

| | | | |
|---|---|---|---|
| 101720 | 6/1985 | Japan | 360/135 |
| 133067 | 6/1986 | Japan | 369/275.5 |
| 289946 | 12/1987 | Japan | 360/114 |
| 191335 | 8/1988 | Japan | 369/275.1 |

*Primary Examiner*—George J. Letscher
*Attorney, Agent, or Firm*—Limbach & Limbach L.L.P.

[57] ABSTRACT

An optical disc having a functional film, formed by a thin metal plate, and a protective film, formed on a transparent substrate, is disclosed. The protective film satisfies a condition $d \geq 2d_0$, where d is a maximum film thickness at an outer periphery of the protective film and $d_0$ is a mean film thickness at a flat portion on a data area. A magneto-optical disc having a functional film which is a metal thin film having magneto-optical effects is also disclosed, wherein the protective film satisfies a condition that a difference $L_1$ between a maximum film thickness $\underline{d}$ at the outer periphery of the protective film and a mean film thickness $d_0$ at a flat portion of the data area is 40 $\mu$m or less and the protective film has a curved surface having a radius of curvature $R_1 \geq 12.48$ mm at the outer periphery of the protective film. The present invention provides an optical disc having superior recording properties and a sufficient corrosion resistance even when the disc is provided with a highly corrosive thin metal film, such as a rare earth-transition metal amorphous thin film.

8 Claims, 4 Drawing Sheets

OPTICAL DISC HAVING A PROTECTIVE LAYER WHICH IS THICKER AT ITS OUTER PERIPHERY

This is a continuation of application Ser. No. 07/994,662 filed on Dec. 22, 1992, now abandoned.

BACKGROUND OF THE INVENTION

FIELD OF THE INVENTION

This invention relates to an optical disc and, more particularly, to improvement of a protective film on the optical disc and of a magnetic head device employed with the optical disc.

The optical disc for recording and/or reproducing information by laser light radiation, the digital audio disc or compact disc and the optical video disc or laser disc, have become popular.

The optical disc, such as a digital audio disc, has a transparent substrate, a pattern of pits and lands corresponding to information signals, and a reflective film formed by a thin metal film, such as an Al film, and a protective film for separating the reflective film from moisture in air and oxygen, are formed in this order on the substrate. The protective film is a layer of UV curable resin which is usually applied uniformly on the entire surface of the reflective film by spin coating or roll coating and cured in situ.

Meanwhile, with the above-described optical disc, only the information signals formed by the manufacturer on the transparent substrate are read, while it is not possible for the user to write information signals directly on the optical disc. Recently, a magneto-optical disc has been developed as an optical disc on which information signals can be recorded and erased repeatedly by the user, and presented to the market.

With the above-described magneto-optical disc, a magnetic thin film having an axis of easy magnetization in a direction perpendicular to the film surface and exhibiting large magneto-optical effects is employed. For recording, the magnetic thin film is partially raised in temperature, by radiating a laser light beam, to a temperature higher than the Curie temperature or a compensation temperature to extinguish coercivity at the heated area for aligning the direction of magnetization with that of an external recording magnetic field. For playback, a laser light is radiated on the thin magnetic film to read out the recorded information by taking advantage of the magnetic Kerr effect or the Faraday effect.

The thin magnetic film having properties required of the recording magnetic layer may be exemplified by a rare earth-transition metal amorphous thin film, such as a TbFeCo based amorphous thin film.

The magneto-optical disc has a recording section formed by stacking a reflective layer and a dielectric layer on the rare earth-transition metal amorphous thin film, and the protective film is formed on the recording section. The magneto-optical discs are of two types, that is of a single side type and a double side type in which two magneto-optical discs are bonded together with the protective films facing each other so that recording/playback may be made from both sides. The single side type magneto-optical disc is attracting attention as a standard item.

Meanwhile, since the rare earth-transition metal amorphous thin film, formed as a recording magnetic layer, is highly corrosive, a water-proofness higher than that demanded of an optical disc, such as a digital audio disc, is demanded of the protective film of the magneto-optical disc. Above all, for the single side type magneto-optical disc, the demand laid on its protective film is more severe because the protective film is exposed directly to atmosphere.

For this reason, attempts have been made for forming a UV curable resin layer of a larger thickness or a higher cross-linking degree on the recording section as a protective layer for a magneto-optical disc. However, if the UV curable resin layer of a larger film thickness or a higher cross-linking degree is formed on the recording section, the substrate tends to be warped due to curing contraction. Consequently, a UV curable resin layer having the same film thickness and cross-linking degree as that of the digital audio disc is formed as a protective film, for the magneto-optical disk and sufficient resistance to corrosion is achieved.

OBJECT AND SUMMARY OF THE INVENTION

In view of the above-described status of the art, it is therefore an object of the present invention to provide an optical disc in which sufficient corrosion resistance may be achieved when it has a highly corrosive functional film, such as a rare earth-transition metal amorphous thin film.

According to the present invention, there is provided an optical disc having a functional film, formed by a thin metal film, and a protective film, characterized in that a maximum film thickness $\underline{d}$ at an outer periphery of said protective film and a mean film thickness $d_0$ at a flat portion on a data area of the disc are related by the formula $d \geq 2.0\ d_0$.

According to the present invention, sufficient corrosion resistance may be realized even when a highly corrosive metal thin film, such as a rare earth-transition metal amorphous thin film, is formed as a functional film, and satisfactory recording characteristics may be achieved. Preferably, a radius of curvature of the protective film at the outer periphery of the film is equal to or greater than a radius of curvature of an outer portion of a sliding contact surface of a magnetic head device, and the radius of curvature of the protective film at the outer periphery is equal to or greater than 12.48 mm.

DETAILED DESCRIPTION OF THE PREFERRED EMBODIMENTS

Figure 1:
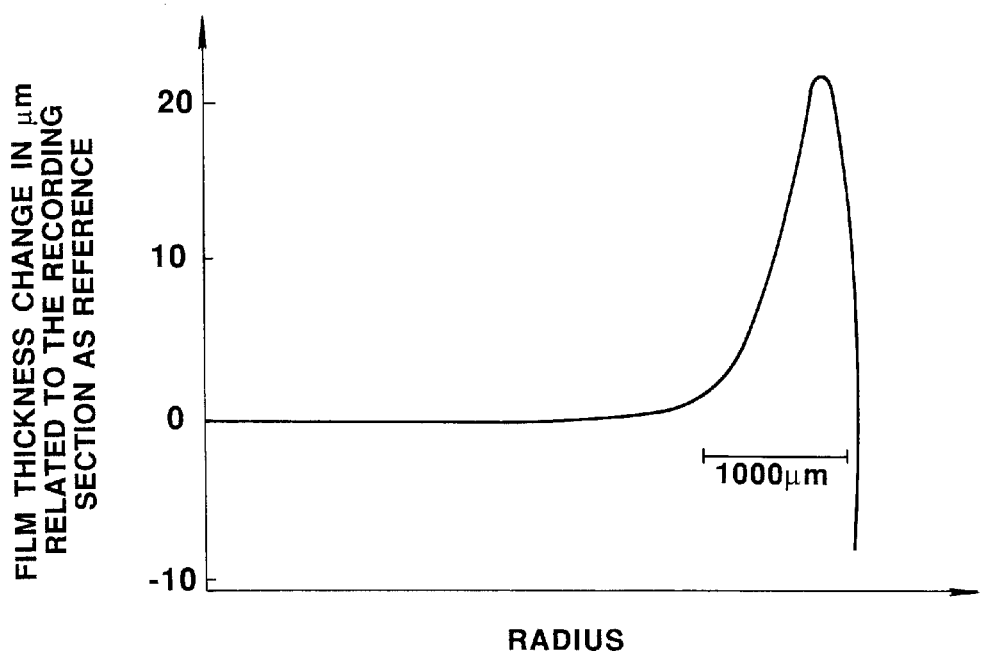
FIG. 1 is a graph showing a surface shape profile of an optical disc according to the present invention.

As a result of eager searches towards accomplishing the above object, the present inventors have arrived at the conclusion that resistance to corrosion of the optical disc having a thin metal film such as a rare earth-transition metal amorphous thin film can be significantly improved by increasing the film thickness at an outer periphery of a protective film.

The optical disc according to the present invention is proposed based on the above information, and consists of an optical disc having a functional film, formed by a thin metal film, and a protective film, characterized in that a maximum film thickness $\underline{d}$ at an outer periphery of the protective film and a mean film thickness $d_0$ at a flat portion on a data area of the disc are related by the formula $\underline{d} \geq 2.0\ d_0$.

The optical disc of the present invention comprises a transparent substrate, a recording section including functional films such as a recording layer and a reflective layer formed on the substrate and a protective layer formed on the recording section.

The transparent substrate may be formed of any substrate material commonly employed for an optical disc, such as a polycarbonate resin, polymethyl methacrylate resin or an amorphous polyolefin resin.

The functional film, such as a recording layer or a reflective layer, formed on the transparent substrate, may be arbitrarily selected according to application and usage. In a digital audio disc or a so-called CD-ROM, a reflecting film of metal, such as Al, is deposited on a disc substrate on which a pattern of pits and lands have been transcribed. In a magneto-optical disc, a perpendicular magnetic film having magneto-optical properties, such as magnetic Kerr effect or Faraday effect, such as a rare earth-transition metal alloy amorphous film, exemplified by TbFeCo based amorphous thin film, is deposited as a recording layer on the transparent substrate.

The protective film is used for protecting the recording section from impacts or preventing corrosion or pitting of the recording section.

According to the present invention, in order that a highly corrosive metal thin film, such as a rare earth-transition metal alloy amorphous film, used as the above-described functional film, may be positively protected against corrosion by the protective film, such protective film satisfying the condition of $\underline{d} \geq 2.0\ d_0$, where d is a maximum film thickness at the outer periphery and $d_0$ is a mean film thickness at a flat portion on a data area. That is, a protective film having a larger film thickness at the outer periphery, is employed.

While the protective film tends to permit moisture or $O_2$ as corrosion factors to be intruded at, above all, an outer peripheral region of the disc, it becomes possible to effectively prevent these corrosion factors from being intruded by increasing the film thickness at the peripheral region to provide improved water-proofing effects.

The protective film is formed by coating a UV-curable resin, such as acrylic UV-curable resins, by spin coating, followed by irradiation by UV rays.

For applying the UV curable resin by spin coating, a prescribed amount of the UV curable resin is applied dropwise at a mid part of the recording section, and the disc is set into rotation. The UV curable resin is propelled by a centrifugal force towards the outer rim of the disc so as to be distributed over the entire recording zone. When subsequently the rotation of the disc is terminated, a coating film of the UV curable resin is formed on the recording zone with a heave at the outer rim of the disc. If the disc is allowed to stand, the UV curable resin at the heaved portion flows gradually towards the center to flatten out the outer rim of the disc. However, if the disc is irradiated with UV rays directly after termination of the disc rotation to cure the film with the resin being heaved at the rim, or if the disc is rotated during irradiation of the UV rays to inhibit the flow of resin from the heaved portion towards the center under the effects of the centrifugal force, the protective film may be formed with the heaved portion at the disc rim region.

A mean film thickness $d_0$ at the flat portion of the data area and the maximum film thickness $\underline{d}$ at the outer rim region may be controlled to desired values by controlling the number of revolutions of the disc, the duration of disc rotation for flinging the resin, the time which elapses since the time of cessation of the disc rotation until the irradiation of UV rays or the number of rotations of the disc during irradiation of the disc with UV rays. The protective film satisfying the condition of $\underline{d} \geq 2.0\ d_0$ may be formed by adjusting these conditions.

Meanwhile, the mean film thickness $d_0$ at the flat portion in the data area of the protective film of UV curable resin is desirably thicker in film thickness for assuring protection of the recording zone. However, it is usually controlled to be 3 to 10 $\mu$m because an excessive thickness of the flat portion tends to cause warping of the substrate due to contraction on curing.

Meanwhile, the recording/reproducing apparatus for a magneto-optical disc on which a thin metal film having magneto-optical effects is formed as a functional film so as to be used as a recording layer is usually arranged so that a magnetic head device as a magnetic field generating device is mounted facing the recording magnetic layer of the disc and an optical pickup device for radiating a laser light beam is mounted facing the side of the disc opposite to the recording magnetic layer with the substrate in-between. With such magnetic head device, only an extremely weak magnetic field may be generated because of various constraints such that the magnetic head device needs to be positioned as close to the magneto-optical disc as possible. For this reason, the magnetic head device made up of a magnetic recording zone and an actual sliding zone is employed. The magnetic recording zone has a magnetic head element for generating a recording magnetic field, whereas the actual sliding zone arranged as a more inner position than the magnetic recording section, is contacted with the magneto-optical disc under a load imposed by a spring for supporting the magnetic recording zone at a small distance from the disc surface.

For recording the information by such magnetic head device, the actual sliding zone is kept in sliding contact with the protective film of the magneto-optical disc, so that the film thickness or shape of the protective film of the magneto-optical disc and the shape of the magnetic head device need to be matched to one another.

When the functional film consisting of a metal thin film is a perpendicular recording magnetic film having a functional film formed by a thin metal film exhibiting magneto-optical effects, a difference $L_1$ between a maximum film thickness $\underline{d}$ at the outer most region of a protective film and a mean film thickness $d_0$ at a flat portion of a data area of the disc is 40 $\mu$m or less, or the protective film is gradually increased in thickness at an outer periphery of the disc to form a curved surface having a radius of curvature of 12.48 mm or more.

According to the present invention, recording is performed by a magnetic head device having a magnetic recording section and an actual sliding section, and in that a height $L_2$ of the magnetic recording section from the sliding contact surface when the actual sliding section is slidingly contacted with the sliding contact surface of the optical disc is related with a difference $L_1$ between a maximum film thickness $\underline{d}$ at the outer most region of a protective film and a mean film thickness $d_0$ at a flat portion of a data area of the disc by $L_2 > L_1$, or alternatively, when the magnetic recording section is positioned at an outer most recordable peripheral region of the optical disc, the actual sliding section is slidingly contacted with the flat portion of the protective film on the data area.

With the above-described magneto-optical disc, since too large a distance between the recording zone and the magnetic head element at an outer most part of the recording region of the magneto-optical disc tends to produce recording failure due to spacing loss, the difference $L_1$ between the maximum film thickness $\underline{d}$ at an outer periphery of the disc and mean film thickness $d_0$ at the flat zone in the data area is preferably not more than 40 μm. On the other hand, with the magnetic head device employing the magneto-optical disc, a height $L_2$ of the magnetic recording zone from the sliding surface of the magneto-optical disc is preferably related with $L_1$ by a formula $L_2 > L_1$. On the other hand, with the above-described magneto-optical disc, a radius of curvature $R_1$ of a curved surface produced at the disc rim region of less than 12.48 mm is not desirable because the sliding zone of the magnetic head device is slid off from the curved surface to render it impossible to record the information on the outer most region of the recording zone of the magneto-optical disc. Besides, with the magnetic head device employing the above-mentioned magneto-optical disc, if the magnetic recording region is positioned at an outer most position in the recording region of the disc, the sliding section is slidingly contacted with the flat portion of the protective film on the data area, so that the distance between the magnetic head element and the recording section remains unchanged when recording at the outer most position of the recording region and hence the spacing loss is hardly produced.

Meanwhile, the protective film satisfying the above conditions may also be produced by controlling the number of revolutions of the disc for flinging the resin during coating the UV curable resin by spin coating, the duration of disc rotation for flinging the resin, the time which elapses since the time of cessation of the disc rotation until the irradiation of UV rays or the number of rotation of the disc during irradiation of the disc with UV rays.

With the optical disc according to the present invention, a protective film is provided which satisfies the conditions that the maximum film thickness $\underline{d}$ at the outer rim region and the mean film thickness $d_0$ at the flat region on the data area are related to each other by $d \geq 2.0\ d_0$. With the optical disc having such protective film, it is possible to prevent the moisture and oxygen from being intruded at the outer rim region which was not possible with the conventional optical disc. Consequently, when a highly corrosive thin metal film, such as, for example, rare earth-transition metal amorphous thin film, is employed as a functional film, the film exhibits superior corrosion resistance so that recording/playback may be achieved with high reliability. Besides, with the optical disc according to the present invention, if the functional film formed by a metal thin film is a perpendicular recording magnetic film exhibiting magneto-optical effects, the difference $L_1$ between the maximum film thickness $\underline{d}$ at the outer rim region of the protective film and the mean film thickness $d_0$ at the flat portion in the data area is 40 μm or less, or alternatively, the protective film is increased gradually at an outer rim region to form a curved surface having a radius of curvature $R_1$ of 12.48 mm or more, so that superior resistance to corrosion is achieved and satisfactory recording may be achieved at the outer most position of the recording region to achieve recording and/or reproduction with high reliability.

Besides, in accordance with the present invention, recording on the above-described magneto-optical disc may be achieved with the magnetic head device having the magnetic recording section and the sliding section, and the height $L_2$ of the magnetic recording section from the sliding surface when the sliding section is slidingly contacted with the sliding contact surface of the disc is related with the height $L_1$, which is the difference between the maximum film thickness $\underline{d}$ at the outer periphery of the protective film and the mean film thickness $d_0$ at the flat portion of the data area, by the formula $L_2 > L_1$, or alternatively, the sliding section is slidingly contacted with the flat region of the protective film on the data area, so that satisfactory recording may be achieved at the outer most region of the recording section and recording/playback may be achieved with high reliability and superior corrosion to resistance of the optical disc.

EXAMPLES

The present invention will be explained with reference to illustrative Examples.

EXPERIMENTAL EXAMPLES

A first dielectric layer, a recording magnetic layer, a second dielectric layer and a reflective layer, were deposited by sputtering step by step on a polycarbonate substrate, without masking the outer region, for forming a recording section. A UV-curable resin having a viscosity of 50 cps was applied to the recording section by spin coating. After cessation of the disc rotation, the disc was irradiated with UV rays within 1 second using a high-pressure mercury lamp, for forming a protective film, for producing magneto-optical discs (sample discs 1 to 8).

The conditions under which the protective films were formed on the disc samples, namely the condition of flinging the resin during spin coating and the number of revolutions of the disc during radiation of UV rays, the maximum film thickness $\underline{d}$ at the outer periphery of the protective film and the mean film thickness $d_0$ at the flat section of the data area, are shown in Table 1.

TABLE 1

| | condition of forming protective film | | | film thickness of data area (μm) | film thickness do at outer periphery (μm) |
|---|---|---|---|---|---|
| | flinging (rpm) | flinging time(sec) | rpm during uv rays irradiation (rpm) | | |
| sample disc 1 | 2000 | 10 | 0 | 5.1 | 27.4 |
| sample disc 2 | 2500 | 8 | 0 | 4.6 | 18.8 |
| sample disc 3 | 3000 | 5 | 0 | 4.8 | 13.2 |
| sample disc 4 | 3000 | 10 | 0 | 3.4 | 10.2 |
| sample disc 5 | 4000 | 5 | 0 | 3.6 | 11.1 |
| sample disc 6 | 3000 | 5 | 100 | 4.9 | 11.9 |
| sample disc 7 | 3000 | 5 | 300 | 4.7 | 12.8 |
| sample disc 8 | 3000 | 5 | 500 | 4.8 | 12.4 |

A profile of a surface shape of the sample disc 1, as measured with P-1 manufactured by TEN CALL Inc. is shown for reference in FIG. 1.

For comparison, magneto-optical discs (comparative discs 1 to 4) were produced in the same way as in Example 1 except applying a UV curable resin by spin coating and radiating UV rays after lapse of 5 seconds since cessation of the disc rotation for forming a protective film.

The time since cessation of disc rotation until irradiation of UV rays was set to 5 seconds for adaptation to the time involved in handling during usual spin coating.

The conditions under which the protective films were formed on the disc samples, namely the condition of flinging the resin during spin coating and the number of revolutions of the disc during radiation of UV rays, the maximum film thickness $\underline{d}$ at the outer periphery of the protective film and the mean film thickness $d_0$ at the flat section of the data area, are shown in Table 2.

TABLE 2

| | condition of forming protective film | | | film thickness of data area ($\mu$m) | film thickness do at outer periphery ($\mu$m) |
|---|---|---|---|---|---|
| | flinging (rpm) | flinging time(sec) | rpm during uv rays irradiation (rpm) | | |
| compar.disc 1 | 3000 | 5 | 0 | 4.9 | 5.6 |
| compar.disc 2 | 2500 | 5 | 0 | 5.8 | 6.6 |
| compar.disc 3 | 2000 | 5 | 0 | 7.2 | 8.3 |
| compar.disc 4 | 1500 | 5 | 0 | 9.8 | 11.2 |

Figure 2:
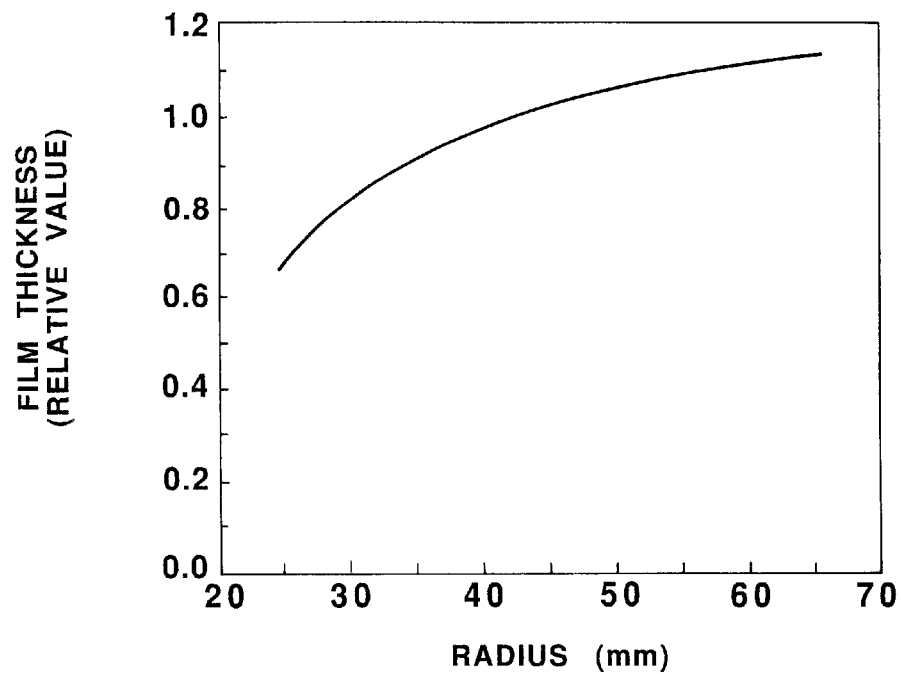
FIG. 2 is a graph showing a surface shape profile of a conventional optical disc.

A profile of a surface shape of the comparative discs is shown for reference in FIG. 2.

Ten each of the sample and comparative discs were allowed to stand for 1000 hours under high temperature and high humidity conditions of 80° C. and 85% to check for the byte error rate before and after the discs were allowed to stand. The byte error rate was checked by a driver manufactured by SONY CORPORATION under the trade name of SMO-D501 up to 1000th track from the outer most track. The results are shown in Table 3 in which the amount of warping caused to the substrates of the discs is also shown.

TABLE 3

| | byte error rate | | wash of substrate (mrad) |
|---|---|---|---|
| | before allowing to stand | after allowing to stand | |
| sample disc 1 | $4.3 \times 10^{-6}$ | $7.4 \times 10^{-6}$ | +0.4 |
| sample disc 2 | $3.7 \times 10^{-6}$ | $7.6 \times 10^{-6}$ | −0.8 |
| sample disc 3 | $4.1 \times 10^{-6}$ | $6.9 \times 10^{-6}$ | +0.2 |
| sample disc 4 | $4.2 \times 10^{-6}$ | $9.8 \times 10^{-6}$ | +0.6 |
| sample disc 5 | $6.1 \times 10^{-6}$ | $1.0 \times 10^{-5}$ | +0.5 |
| sample disc 6 | $4.8 \times 10^{-6}$ | $8.7 \times 10^{-6}$ | +0.3 |
| sample disc 7 | $3.9 \times 10^{-6}$ | $9.1 \times 10^{-6}$ | +0.1 |
| sample disc 8 | $5.3 \times 10^{-6}$ | $8.9 \times 10^{-6}$ | ±0.0 |
| compar.disc 1 | $5.7 \times 10^{-6}$ | $4.1 \times 10^{-5}$ | +0.1 |
| compar.disc 2 | $5.2 \times 10^{-6}$ | $3.5 \times 10^{-5}$ | −1.2 |
| compar.disc 3 | $4.4 \times 10^{-6}$ | $2.3 \times 10^{-5}$ | −2.6 |
| compar.disc 4 | $3.7 \times 10^{-6}$ | $1.4 \times 10^{-5}$ | −4.8 |

It is seen from Table 3 that the sample discs 1 to 8 having the protective films satisfying the condition of $\underline{d} \geq 2\, d_0$ exhibit a low byte error rate of not more than $1 \times 10^{-5}$ even after left under the high temperature high humidity conditions and hence are superior in resistance to corrosion. Besides, these sample discs undergo warping as low as ±1 mrad or less and a satisfactory shape.

Conversely, the magneto-optical discs having protective films not satisfying the condition of $\underline{d} \geq 2\, d_0$, that is the magneto-optical discs having the protective films of uniform thicknesses on the entire recording section, undergo a significant increase in byte error rate when left under the above-mentioned high temperature and high humidity conditions, if the protective films are of reduced thicknesses, whereas, if the protective films are of increased film thicknesses, the substrates undergo severe warping and are deteriorated in mechanical properties.

It is seen from the above results that the protective film satisfying the condition of $\underline{d} \geq 2\, d_0$ in an optical disc is effective in providing an optical disc having superior resistance to corrosion and a satisfactory shape.

CONSTRUCTIONAL EXAMPLE OF MAGNETIC HEAD DEVICE

Referring to the drawings, an illustrative example of a magnetic head device which may be employed with the optical disc of the present invention is explained. The recording/reproducing apparatus for a magneto-optical disc in which the functional film is a thin metal film having magneto-optical effects is provided with the magnetic head device as the magnetic field generating device and the optical pickup device radiating the laser light for facing a recording magnetic layer of the disc and facing the opposite side of the disc with the substrate in-between. With such apparatus, the recording magnetic layer is partially raised in temperature by the laser light radiated from the optical pickup device and the recording magnetic field is applied by the magnetic head device for recording, while the laser light is applied by the optical pickup device on the recording magnetic layer for playback under the magneto-optical effects. However, with the above-described magnetic head device, only an extremely small magnetic field may be generated because of various constraints, such that it becomes necessary to provide the magnetic head device as close to the magneto-optical disc as possible.

Figure 3:
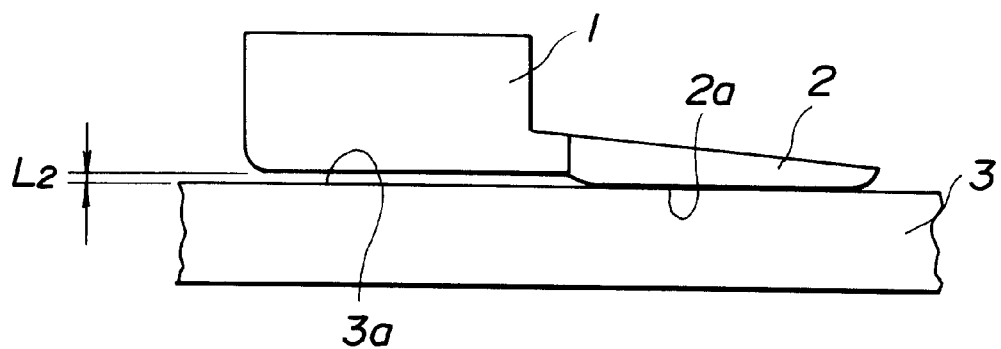
FIG. 3 is a side view showing an example of a magnetic head device adapted for the optical disc of the present invention.

Thus a magnetic head device made up of a magnetic recording section and an actual sliding section is employed. The magnetic head device is made up of the magnetic recording section 1 having a magnetic head element, not shown, and the actual sliding section 2 supporting the recording section 1, as shown for example in FIG. 3. The sliding section 2 is provided more inwards than the magnetic recording section 1 and is contacted with a magneto-optical disc 3, as an optical disc of the present invention, under the bias of a spring, not shown, while the magnetic recording section is supported by the sliding section so as to be separated by a height $L_2$ from a sliding surface $3a$ of the magneto-optical disc. For conformance of the magnetic head device to the optical disc of the present invention, the height $L_2$ is related with a difference $L_1$ between the maximum film thickness $\underline{d}$ at the outer periphery of the protective film of the magneto-optical disc and the mean film thickness $d_0$ at the flat portion on the data area by a relation $L_2 > L_1$.

The above-described construction of the magnetic head device made up of the magnetic recording section and the sliding section is desirable for reducing the size and costs and for simplifying the construction.

Figure 4:
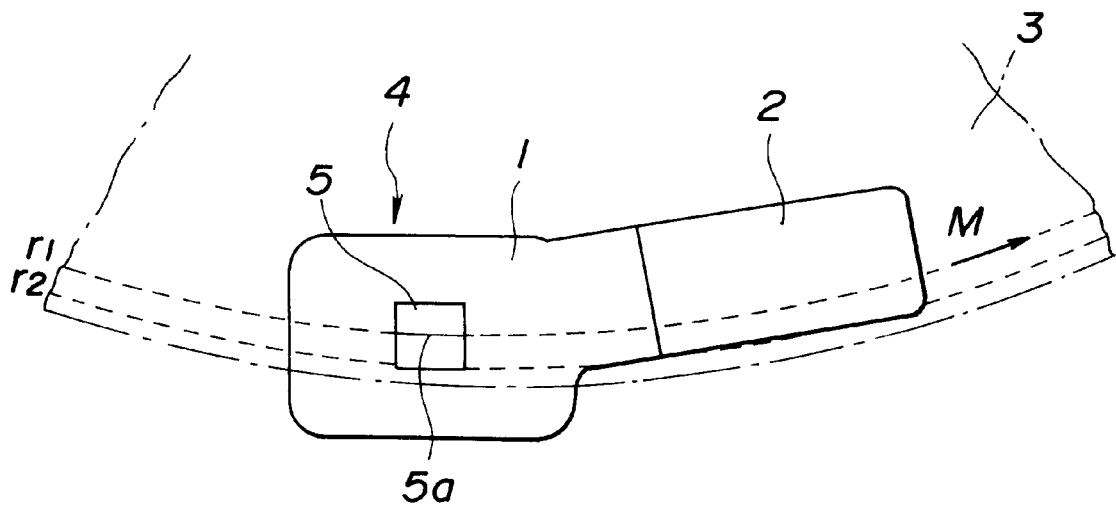
FIG. 4 is a bottom view showing the magnetic head device shown in FIG. 3.

FIG. 4 shows the magnetic head device in the direction of the magneto-optical disc 3. The magneto-optical disc 3 is rotated as shown by arrow M in FIG. 4 and the magnetic recording section 1 having the magnetic head element 5 and the actual sliding section 2 are provided forwardly and rearwardly along the sliding contact direction of the magnetic head device 4, respectively. For increasing the recordable region of the magnetic recording section 1, the sliding section 2 is provided more inwardly of the disc than the magnetic recording section 1 for being extended along the sliding contact direction of the magnetic head device 4 with the magneto-optical disc 3. When the magnetic recording section of the magnetic head device records the information on the outer most position of the recording region of the optical disc, the sliding section is slid in contact with the flat portion of the protective film on the data area.

For conformance to the optical disc of the present invention having a diameter of 64 mm, an outer most recordable position is at a position of 30.5 mm radius, the difference $L_1$ between the maximum film thickness $\underline{d}$ at the outer periphery and the mean film thickness $d_0$ at the flat portion of the data area is 40 μm, and a heaved portion is started at a position of the radius of 31.0 mm at a radius of curvature $R_1$ of 12.48 mm to form the heave at the outer most region, the sliding section is adapted to be positioned more inwardly than the radius 31.0 mm position when the magnetic recording section records the information at the radius 30.5 mm position. That is, when a center 5a of a magnetic head element 5 provided on the magnetic recording section 1 of the magnetic head device 4 is tracking the outer most recordable 30.5 mm radius position as indicated at $r_1$ of the magneto-optical disc 3, the sliding section 2 is adapted to be slid in contact with the disc portion which is situated more inwardly of the 31.0 mm radius heave start position indicated at $r_2$, as shown in FIG. 4.

Figure 5:
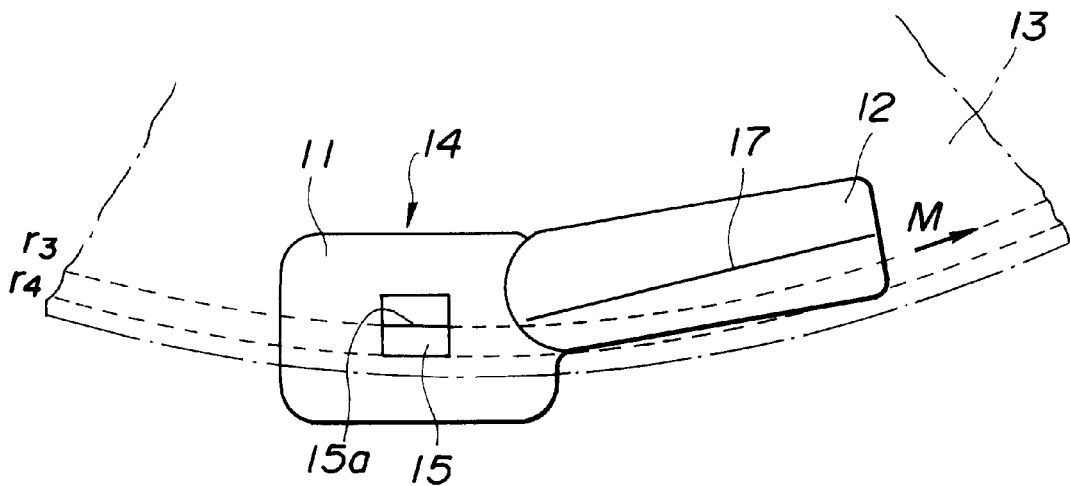
FIG. 5 is a bottom view showing another example of a magnetic head device adapted for the optical disc of the present invention.
Figure 6:
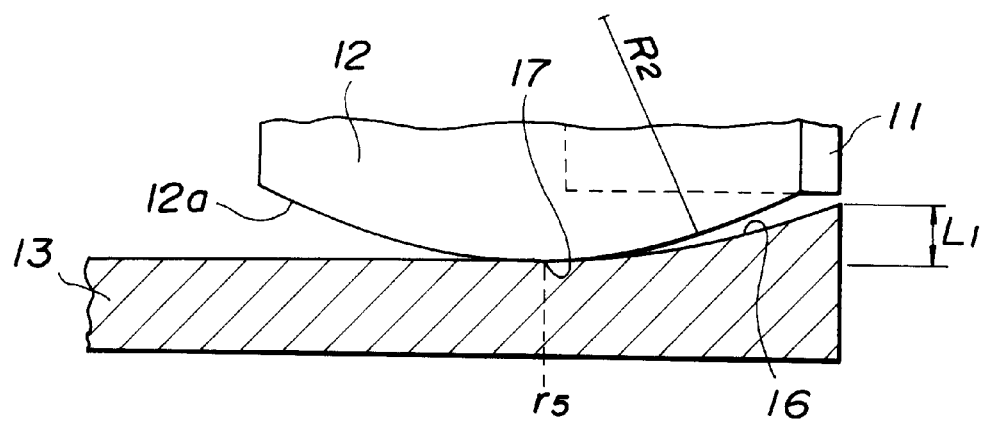
FIG. 6 is an enlarged front view showing a magnetic head device adapted for the optical disc according to the present invention.

If, as shown in FIG. 6, the actual sliding section 12 is rounded in contour with an R of a radius of curvature $R_2$ so as to be free from contact with a curved portion 16 of the magneto-optical disc 13 having an outer protective layer 16 as described above, and an actual sliding point 17 is provided on a disc sliding surface 12a of the sliding section 12, it becomes possible to approach the sliding contact point more closely to the center 15a of the magnetic head element 5 than when the sliding section is not rounded, as indicated in FIG. 2. That is, by providing the actual sliding point 17 of the sliding section 12 in the vicinity of an extension of a centerline 15a of the magnetic head element 15 of the magnetic recording section 11, it becomes possible to elongate the actual sliding section 12 to improve disposition stability of the magnetic head device 14 in sliding contact with the magneto-optical disc 13 in a direction of arrow M in FIG. 5.

If the sliding contact position of the sliding site 17 is at the 31.0 mm radius position, the radius of curvature $R_2$ of the rounding of the sliding section 12 may be less than 12.48 mm ($R_2$<12.48 mm ). However, if the sliding contact position $r_5$ of the actual sliding site 17 is more inward than the 31.00 mm radius position, the radius of curvature $R_2$ may be found as follows:

$$(32.0-r_5)^2+(R_2-0.04)^2=R_2^2$$

so that $$R_2=12.5r_5^2-800r_5+12800.02 \text{ [mm]}$$

When the sliding contact position $r_5$ of the sliding contact point 17 is more inward than the 31.0 mm radius position, contact with the curved surface 16 of the magneto-optical disc 13 may be inhibited by reducing the radius of curvature $R_2$ of the sliding section 12 so as to be smaller than the value obtained by the above formula.

Although the outer and inner sides of the sliding section 12 are rounded in FIG. 6, only the outer side of the sliding section 12 may be rounded for achieving comparable results.

Figure 7:
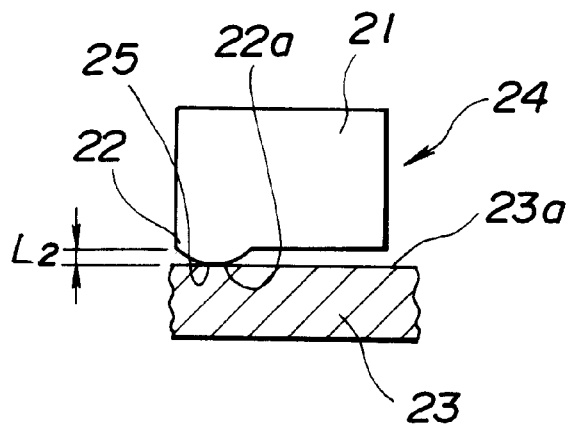
FIG. 7 is a front view showing still another example of a magnetic head device adapted for the optical disc according to the present invention.

As an alternative of the shape of the magnetic head device for conformance to the optical disc of the present invention, an actual sliding section 22 may be provided at a portion of the radially inner zone of the magnetic recording section 21 of a magnetic recording device 24, as shown in FIG. 7. The actual sliding section 22a has a surface facing the disc 23 which is rounded so as to be free from contact with the curved surface of the magneto-optical disc 23 to form an actual sliding point 25. With the present magnetic head device 24, the height $L_2$ of the magnetic recording section 21 from the sliding contact surface 23a of the magneto-optical disc 23 is related with the difference $L_1$ between the maximum film thickness $\underline{d}$ at the outer periphery of the protective film of the magneto-optical disc and the mean film thickness $d_0$ at the flat portion of the data area by $L_2>L_1$, as shown in FIG. 7.

Figure 8:
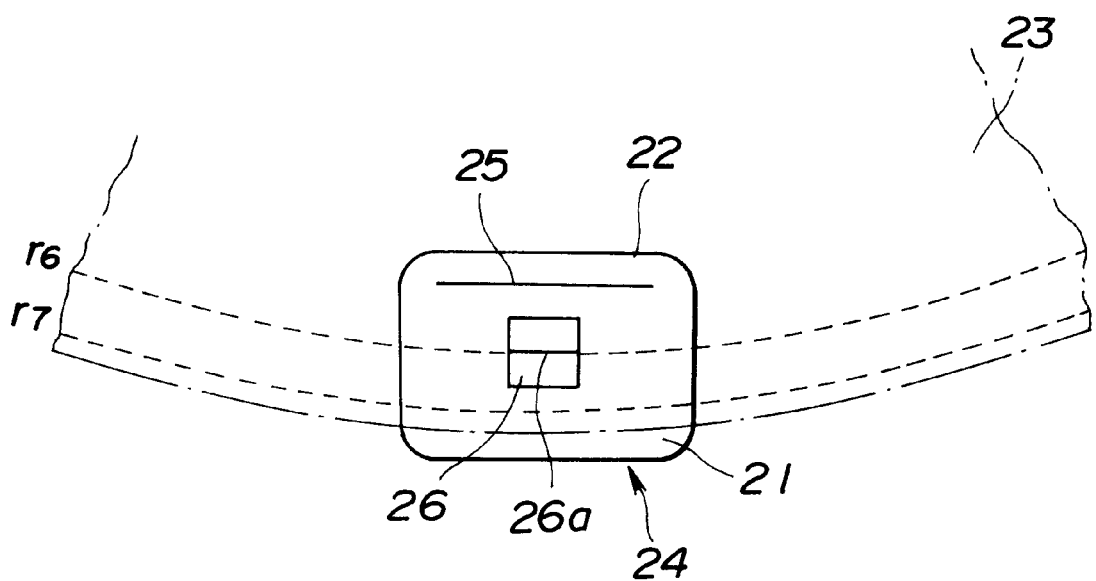
FIG. 8 is a bottom view showing the magnetic head device show n in FIG. 7.

FIG. 8 shows the magnetic head device as viewed in the direction of magneto-optical disc. When a center 26a of a magnetic head element 26 provided on the magnetic recording section 21 of the magnetic head device 24 is tracking the recordable outer most 30.5 mm radius position as indicated at $r_6$ of the magneto-optical disc 23, the actual sliding point 7 is adapted for being slidingly contacted with a position radially inward of the 31.0 mm radius heave start position $r_7$, as shown in FIG. 8.

It is seen from above that the present invention provides an optical disc having a protective film satisfying the condition of $d \geq 2.0\ d_0$, where d is the maximum film thickness at the outer most region and $d_0$ the mean film thickness at the flat portion of the data area, whereby it is possible to prevent corrosion or pitting of a highly corrosive thin metal film as a functional film to achieve superior corrosion resistance. Consequently, a practically useful service life may be achieved with the magneto-optical disc to permit diversification of the recording system of the optical disc.

Besides, with the optical disc according to the present invention, if the functional film formed by a metal thin film is a perpendicular recording magnetic film exhibiting magneto-optical effects, the difference $L_1$ between the maximum film thickness $\underline{d}$ at the outer rim region of the protective film and the mean film thickness $d_0$ at the flat portion in the data area is 40 μm or less, or alternatively, the protective film is increased gradually at an outer rim region to form a curved surface having a radius of curvature $R_1$ of 12.48 mm or more, so that superior resistance to corrosion is achieved and satisfactory recording may be achieved at the outer most position of the recording region to achieve recording and/or reproduction with high reliability and an optical disc with superior quality.

In addition, in accordance with the present invention, recording on the above-described magneto-optical disc may be achieved with the magnetic head device having the magnetic recording section and the sliding section, and the height $L_2$ of the magnetic recording section from the sliding surface when the sliding section is slidingly contacted with the sliding contact surface of the disc is related with the height $L_1$, which is the difference between the maximum film thickness $\underline{d}$ at the outer periphery of the protective film and the mean film thickness $d_0$ at the flat portion of the data area, by the formula $L_2>L_1$, or alternatively, the sliding section is slidingly contacted with the flat region of the protective film on the data area, when the magnetic recording section is positioned at an outer most position in the recordable region of the optical disc so that satisfactory recording may be achieved at the outer most region of the recording section and recording/playback may be achieved with high reliability, while superior corrosion to resistance of the optical disc may be realized to provide an optical disc with superior quality.

What is claimed is:

1. An optical disc, comprising:

a substrate;

a functional metallic film arranged over the substrate;

a protective film arranged over the functional film, wherein the protective film has a maximum film thickness $\underline{d}$ at an outer periphery of the protective film and a mean film thickness $d_0$ at a flat portion of the protective film on a data area of the disc which are related by $$2d_0 \leq d \leq d_0 + 40 \text{ mm},$$

and wherein a radius of curvature of the protective film at the outer periphery of the film is equal to or greater than a radius of curvature of a portion of a sliding contact surface of a magnetic head device radially extending toward said outer periphery of said disk from the reading portion of the magnetic head device, and wherein the radius of curvature of said protective film at said outer periphery is equal to or greater than 12.48 mm.

2. The optical disk of claim 1, wherein a section of the outer portion of the sliding contact surface overlaps a portion of the protective film between the flat portion and an outer edge of the disk.

3. The optical disk of claim 1, wherein data stored at an outer most recordable radius position of the optical disk is readable by a magnetic head device with an elongated sliding contact surface.

4. The optical disk of claim 1, wherein a magnetic head element of the magnetic head device is positioned substantially over a sliding contact point when data stored at an outer most recordable radius position of the optical disk is read by the magnetic head element.

5. The optical disk of claim 1, wherein the maximum film thickness $\underline{d}$ of the outer periphery is greater than the mean film thickness $d_0$ of the flat portion to protect the functional metallic film from corrosion without the substrate being warped due to curing contraction.

6. The optical disk of claim 1, wherein the maximum film thickness $\underline{d}$ of the protective film at the outer periphery and the mean film thickness $d_0$ of the protective film at the flat portion are related by $$2d_0 \leq d \leq d_0 + 40 \text{ μm}.$$

7. An optical disc, comprising:

a substrate;

a functional metallic film arranged over the substrate;

a protective film arranged over the functional film, wherein the protective film has a maximum film thickness $\underline{d}$ at an outer periphery of the protective film and a mean film thickness $d_0$ at a flat portion of the protective film on a data area of the disc which are related by $$2d_0 \leq d \leq d_0 + 40 \text{ mm},$$

and wherein a space over a curved portion of the protective film between the flat portion and the outer edge of the disk is occupied by a first section of a slider contact surface of a magnetic head device, when a second section of the slider contact surface contacts the flat portion.

8. An optical disc, comprising:

a substrate;

a functional metallic film arranged over the substrate;

a protective film arranged over the functional film, wherein the protective film has a maximum film thickness $\underline{d}$ at an outer periphery of the protective film and a mean film thickness $d_0$ at a flat portion of the protective film on a data area of the disc which are related by $$2d_0 \leq d \leq d_0 + 40 \text{ mm},$$

and wherein a space over a curved portion of the protective film between the flat portion and the outer edge of the disk is occupied by a section of a slider contact surface of a magnetic head device, said section of said slider contact surface having a radius of curvature less than the radius of curvature of the curved portion of the protective film, when an outer most recordable area of the functional film is magnetically communicating with a magnetic recording section of the magnetic head device.

* * * * *